United States Patent
Mitomi et al.

(10) Patent No.: US 9,319,309 B2
(45) Date of Patent: Apr. 19, 2016

(54) MOBILE ROUTER INFORMATION MANAGEMENT SERVER, MOBILE ROUTER, MOBILE ROUTER NETWORK, AND COMMUNICATION METHOD FOR SAME

(75) Inventors: Hirotoshi Mitomi, Tokyo (JP); Tsuneo Nakata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 265 days.

(21) Appl. No.: 13/882,415

(22) PCT Filed: Sep. 14, 2011

(86) PCT No.: PCT/JP2011/070963
§ 371 (c)(1),
(2), (4) Date: Apr. 29, 2013

(87) PCT Pub. No.: WO2012/056821
PCT Pub. Date: May 3, 2012

(65) Prior Publication Data
US 2013/0219082 A1  Aug. 22, 2013

(30) Foreign Application Priority Data
Oct. 29, 2010  (JP) .................. 2010-243514

(51) Int. Cl.
*G06F 15/173* (2006.01)
*H04L 12/717* (2013.01)
(Continued)

(52) U.S. Cl.
CPC .............. *H04L 45/42* (2013.01); *H04W 8/082* (2013.01); *H04W 8/26* (2013.01); *H04W 60/00* (2013.01);
(Continued)

(58) Field of Classification Search
CPC ...... H04L 45/42; H04W 8/082; H04W 60/00; H04W 84/005
USPC .......... 709/203, 244, 238, 239, 242; 370/349; 455/433
See application file for complete search history.

(56) References Cited

U.S. PATENT DOCUMENTS

| 2002/0126651 A1* | 9/2002 | Ikeda et al. | 370/349 |
| 2006/0056369 A1* | 3/2006 | Morishige et al. | 370/338 |

(Continued)

FOREIGN PATENT DOCUMENTS

| CN | 1745558 A | 3/2006 |
| EP | 1458150 A2 | 9/2004 |

(Continued)

OTHER PUBLICATIONS

International Search Report for PCT/JP2011/070963 dated Nov. 8, 2011.

(Continued)

*Primary Examiner* — Frantz Jean
(74) *Attorney, Agent, or Firm* — Sughrue Mion, PLLC

(57) ABSTRACT

With the object of enabling data transfer between mobile routers without going through a home agent and establishing a connection to a destination mobile router even when mobile communication terminals equipped in the destination mobile router are changed at the time of initiating connection to the destination mobile router, a mobile router information management server has a mobile router registration information table that registers, for each mobile router, mobile router information that is reported from the mobile routers and that includes identification information of the mobile routers and identification information of mobile communication terminals equipped in the mobile routers, in response to inquiry information from a mobile router that includes identification information of another mobile router that is to be a communication destination, searches the mobile router registration information table, based on the identification information of the other mobile router, for mobile router information that includes identification information of mobile communication terminals equipped in the other mobile router, and returns the searched mobile router information to the mobile router.

11 Claims, 15 Drawing Sheets

(51) Int. Cl.
*H04W 8/08* (2009.01)
*H04W 8/26* (2009.01)
*H04W 60/00* (2009.01)
*H04W 76/02* (2009.01)
*H04W 88/00* (2009.01)
*H04W 88/02* (2009.01)
*H04W 88/14* (2009.01)
*H04W 92/24* (2009.01)

(52) U.S. Cl.
CPC ............. *H04W 76/02* (2013.01); *H04W 88/005* (2013.01); *H04W 88/02* (2013.01); *H04W 88/14* (2013.01); *H04W 92/24* (2013.01)

(56) References Cited

U.S. PATENT DOCUMENTS

2006/0121904 A1* 6/2006 Reuhkala et al. ............. 455/445
2006/0171370 A1 8/2006 Matsumoto et al.
2007/0091838 A1* 4/2007 Kobayashi et al. ........... 370/328

FOREIGN PATENT DOCUMENTS

| | | |
|---|---|---|
| JP | 2003-046517 A | 2/2003 |
| JP | 2003-101565 A | 4/2003 |
| JP | 2003-283515 A | 10/2003 |
| JP | 2003-283546 A | 10/2003 |
| JP | 2005-051757 A | 2/2005 |
| JP | 2005-086519 A | 3/2005 |
| JP | 2007-053667 A | 3/2007 |

OTHER PUBLICATIONS

Communication dated Sep. 15, 2015 from the State Intellectual Property Office of the People's Republic of China in counterpart application No. 201180063406.9.

* cited by examiner

FIG. 2a

| Identification information 1 (mobile routers) | | Identification information 2 (mobile communication terminals) | | Effective interval (sec) |
|---|---|---|---|---|
| Router name | Home address | Terminal type | User information | |
| MR-A | 192.168.10.254 | Wide-area IP network connection (care-of address) | 11.11.11.11 | 180 |
| | | | 22.22.22.22 | |
| | | Circuit switching network connection (telephone number) | 080-1111-1111 | |
| | | | 080-2222-2222 | |

Acquired by manual operation ← → Acquired automatically

FIG. 2b

| Identification information 1 (mobile routers) | | Identification information 2 (mobile communication terminals) | | Effective interval (sec) |
|---|---|---|---|---|
| Router name | Home address | Terminal type | User information | |
| MR-B | 192.168.30.254 | Wide-area IP network connection (care-of address) | 33.33.33.33 | 180 |
| | | | 44.44.44.44 | |
| | | Circuit switching network connection (telephone number) | 080-3333-3333 | |
| | | | 080-4444-4444 | |

Different networks (mobile communication terminals)

A plurality of mobile communication terminals

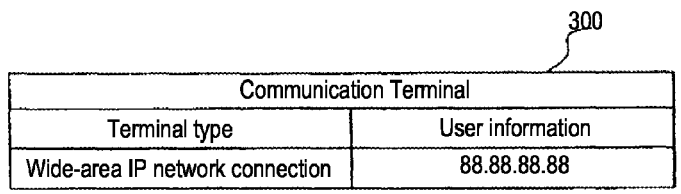
FIG. 3
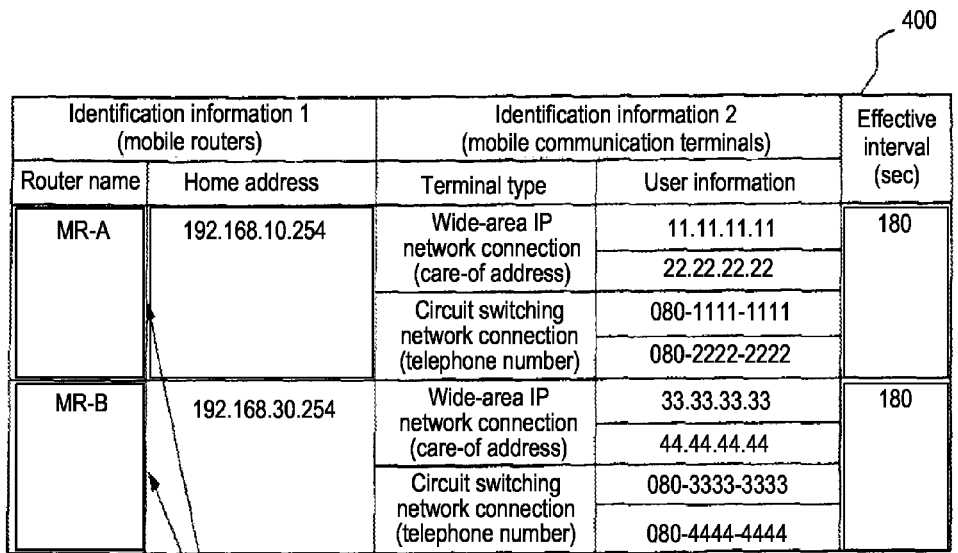
FIG. 4  A plurality of pieces of mobile communication terminal information (identification information 2) are held for each mobile router (identification information 1).

MOBILE ROUTER INFORMATION MANAGEMENT SERVER, MOBILE ROUTER, MOBILE ROUTER NETWORK, AND COMMUNICATION METHOD FOR SAME

CROSS REFERENCE TO RELATED APPLICATIONS

This application is a National Stage of International Application No. PCT/JP2011/070963 filed Sep. 14, 2011, claiming priority based on Japanese Patent Application No. 2010-243514 filed Oct. 29, 2010, the contents of all of which are incorporated herein by reference in their entirety.

TECHNICAL FIELD

The present invention relates to a device capable of network connection, and more particularly relates to a mobile router information management server, a mobile router, a mobile router network that includes these components, and a communication method for these entities.

BACKGROUND ART

In conventional mobile IP (Internet protocol), a configuration is adopted in which each mobile router registers a "care-of address (WAN (Wide Area Network)-side IP address)" and a "home address (LAN (Local Area Network)-side IP address)" as location information to a home agent, the mobile router transmits information to the home agent without knowing the "care-of address (WAN-side IP address)" of the communication-destination mobile router, and the home agent refers to the location information that is held to carry out data transfer to the destination mobile router.

The prior art relating to the above-described mobile router includes the devices described hereinbelow.

For example, JP 2003-101565A (Patent Literature 1) discloses a wireless mobile router capable of selecting a communication path according to the communication content. The wireless mobile router stores path information, and upon receiving a request from a communication device to connect to a terminal, implements control regarding whether to establish communication between the communication device and the terminal based on the stored path information. The path information indicates whether performing communication between the communication device and the terminal by way of the network to which this wireless mobile router is connected is permitted or not in at least one wireless mobile router among a plurality of wireless mobile routers.

Alternatively, JP 2003-046517A (Patent Literature 2) discloses an information management structure for achieving a reduction of interference between neighboring systems. The information management structure implements management such that the hopping pattern used by a wireless mobile router and a hopping pattern used by another wireless mobile router do not overlap.

Still further, JP 2003-283546A (Patent Literature 3) discloses a communication system that is capable collecting a plurality of terminals to solve insufficiency of addresses. When communication is necessary between a terminal under the control of a wireless mobile router and a host on a global network or a terminal under the control of another wireless mobile router, the communication system uses the IP address of the terminal under the control of the wireless mobile router to enable this communication.

CITATION LIST

Patent Literatures

Patent Literature 1: JP 2003-101565A
Patent Literature 2: JP 2003-046517A
Patent Literature 3: JP 2003-283546A

SUMMARY OF THE INVENTION

Problem to be Solved by the Invention

In the above-described mobile IP, data transfer between each of the mobile routers goes by way of a home agent, and the home agent carries out data transfer among all mobile routers. As a result, in the case of a mobile router network having a large number of mobile routers, the communication load (processing load) is concentrated in the home agent, whereby a home agent must be used that can withstand this communication load, leading to an increase in equipment cost and maintenance cost.

In addition, there is the problem of a network configuration that communication is prevented among all mobile routers when a fault occurs at the home agent and renders the home agent unable to operate. In addition, since data transfer among the mobile routers is carried out by way of the home agent, each mobile router and the home agent must be connected to a common network that allows communication between the home agent and each mobile router, and a network that can be used only by mobile routers therefore cannot be used.

The above-described problems can be solved by carrying out direct data transfer between each mobile router rather than data transfer that takes a home agent as center. In this method, the home agent becomes unnecessary and the risk of a fault in the mobile router network can therefore be distributed.

In addition, when a network is used that can be used only among mobile routers, a mobile communication terminal of the destination mobile router can be connected by holding, within each mobile router, identification information or user information of mobile communication terminals that are equipped in the destination mobile router, whereby the usable network can be expanded.

For this purpose, a "home address (LAN-side IP address)" that is the identification information of a mobile router for judging the data transfer destination and a "care-of address (WAN-side IP address) that is the identification information of a mobile communication terminal for data transfer for which centralized management is carried out by a conventional home agent must be held in association with each other on the mobile router side.

However, the "care-of address (WAN-side IP address)" of a mobile communication terminal frequently undergoes dynamic changes according to the communication environment, and the problem therefore arises that when the "care-of address (WAN-side IP address)" of the destination mobile router changes at the time of starting a connection with the destination mobile router, the connection with the destination mobile router cannot be established.

As a result, since the "care-of address (WAN-side IP address)" of a mobile communication terminal is not fixed identification information that specifies the destination mobile router, when starting a connection, a communication-source mobile router must acquire the "care-of address (WAN-side IP address)" that has been acquired by the mobile communication terminal of the destination mobile router and by which communication is currently possible.

Here, a circuit switching network is offered as an example as a network that differs from a wide-area IP network.

When each mobile router has a dial-up connection capability by way of a circuit switching network, the source mobile router must hold the telephone number that is the identification information of a mobile communication terminal equipped in a destination mobile router.

Since the telephone number of a mobile communication terminal equipped in a destination mobile router is dialed up in a connection via a circuit switching network, the problem arises that in the event of a change of the mobile communication terminal that is equipped or the replacement of a mobile communication terminal at another mobile router, connection cannot be realized with the original communication-destination mobile router without changing the setting of the telephone number.

Since the identification information of a specific mobile communication terminal is fixed to a mobile router, a means for acquiring in advance the telephone number that is assigned to the mobile communication terminal is necessary in the event of the additional installation or change of a detachable mobile communication terminal.

In addition, when carrying out communication with a plurality of mobile routers, the settings of a plurality of items such as a "home address (LAN-side IP address)," "care-of address (WAN-side IP address)," and "telephone number (for circuit-switched connection)" must be changed for the plurality of mobile routers and the type of mobile communication terminals equipped in the destination mobile router must be grasped, and as a result, the burden of the operations by which a user makes settings in the mobile router becomes onerous.

In SIP (Session Initiation Protocol) used in, for example, an IP telephone service, a mechanism exists for centralized management of the location information of IP telephone terminals at the SIP server, but the information managed at the SIP server is only address information (WAN-side IP addresses) of a network on which the SIP server can communicate. As a result, a SIP server is unable to manage address information that specifies mobile routers (LAN-side IP addresses) or user information (such as telephone numbers for circuit switched connections) that is realized by a different network with which it cannot directly connect.

None of the previously mentioned Patent Literatures 1 to 3 takes the above-described problems into consideration.

It is therefore an object of the present invention to provide a mobile router information management server, a mobile router, a mobile router network that includes these components, and a communication method of these components that enable data transfer between mobile routers without going by way of a home agent and that, at the time of starting a connection to a destination mobile router, can establish a connection with the destination mobile router even when a mobile communication terminal equipped in the destination mobile router is changed to another mobile communication terminal, thereby solving the above-described problems.

Means for Solving Problem

According to the first aspect of the present invention, a mobile router information management server that is capable of communicating with mobile routers that can be equipped with detachable mobile communication terminals, the mobile router information management server being characterized in that it includes: a mobile router registration information table that registers, for each mobile router, mobile router information that is reported from the mobile router and that includes identification information of the mobile router and identification information of a mobile communication terminals equipped in the mobile router; and control means that, in response to inquiry information from the mobile router that includes identification information of another mobile router that is to be a communication destination, searches the mobile router registration information table, based on the identification information of the other mobile router, for mobile router information that includes the identification information of mobile communication terminals equipped in the other mobile router and returns the searched mobile router information to the mobile router.

According to the second aspect of the present invention, a mobile router is provided that can be equipped with detachable mobile communication terminals, the mobile router being characterized in that it includes: a mobile router information table that registers, as its own mobile router information, identification information of its own mobile router in association with identification information of mobile communication terminals equipped in its own mobile router; and control means that reports its own mobile router information registered in the mobile router information table to a mobile router information management server by control communication so as to enable registration; when communicating with another mobile router that is to be a communication destination, transmits inquiry information that includes identification information of the other mobile router to the mobile router information management server; receives mobile router information that is returned from the mobile router information management server in response to the inquiry information; and initiates communication with the other mobile router based on identification information of mobile communication terminals that are equipped in the other mobile router that is included in the mobile router information.

According to the third aspect of the present invention, a mobile router network is provided that is characterized in that it includes: mobile routers that can be equipped with detachable mobile communication terminals; and a mobile router information management server that can communicate with the mobile routers, wherein the mobile router information management server includes: a mobile router registration information table that registers, for each mobile router, mobile router information that is reported from the mobile routers and that includes identification information of the mobile routers and identification information of mobile communication terminals equipped in the mobile router; and control means that, in response to inquiry information from the mobile router that includes identification information of another mobile router that is to be a communication destination, searches the mobile router registration information table, based on the identification information of the other mobile router, for mobile router information that includes the identification information of mobile communication terminals equipped in the other mobile router and returns the searched mobile router information to the mobile routers; and each of the mobile routers includes: a mobile router information table that registers, as its own mobile router information, identification information of its own mobile router in association with identification information of mobile communication terminals equipped in its own mobile router; and control means that reports its own mobile router information registered in the mobile router information table to the mobile router information management server by control communication so as to enable registration; when communicating with another mobile router that is to be a communication destination, transmits inquiry information that includes identification information of the other mobile router to the mobile router information management server; receives mobile router information that is returned from the mobile router information management server in response to the inquiry information; and initiates communication with the other mobile router based on identification information of mobile communication terminals that are equipped in the other mobile router contained in the mobile router information.

According to the fourth aspect of the present invention, provided is a communication method of a mobile router information management server that can communicate with mobile routers that can be equipped with detachable mobile communication terminals, the communication method being characterized in that it includes: registering in a mobile router registration information table, for each mobile router, mobile router information reported from the mobile router that includes identification information of the mobile routers and identification information of mobile communication terminals equipped in the mobile router; and in response to inquiry information from the mobile router that includes identification information of another mobile router that is to be a communication destination, searching the mobile router registration information table, based on identification information of the other mobile router, for mobile router information that includes identification information of mobile communication terminals equipped in the other mobile router; and returning the searched mobile router information to the mobile router.

According to the fifth aspect of the present invention, provided is a communication method of a mobile router that can be equipped with detachable mobile communication terminals, the communication method being characterized in that it includes: registering in a mobile router information table, as its own mobile router information, identification information of its own mobile router in association with identification information of mobile communication terminals equipped in its own mobile router; reporting its own mobile router information that is registered in the mobile router information table to a mobile router information management server by control communication so as to enable registration; when communicating with another mobile router that is to be a communication destination, transmitting, to the mobile router information management server, inquiry information that includes identification information of the other mobile router; receiving mobile router information that is returned from the mobile router information management server in response to the inquiry information; and initiating communication with the other mobile router based on identification information of mobile communication terminals that are equipped in the other mobile router contained in the mobile router information.

According to the sixth aspect of the present invention, provided is a communication method of a mobile router network that includes mobile routers that can be equipped with detachable mobile communication terminals and a mobile router information management server that can communicate with the mobile routers, the communication method being characterized in that it includes: the mobile router: registering in a mobile router information table, as its own mobile router information, identification information of its own mobile router in association with identification information of mobile communication terminals equipped in its own mobile router; and reporting its own mobile router information that has been registered in the mobile router information management server by control communication so as to enable registration; the mobile router information management server: registering in a mobile router registration information table, for each mobile router, mobile router information that is communicated from the mobile routers and that includes identification information of the mobile routers and identification information of mobile communication terminals equipped in the mobile routers; the mobile router: when communicating with another mobile router that is to be a communication destination, transmitting inquiry information that includes identification information of the other mobile router to the mobile router information management server; the mobile router information management server: in response to inquiry information from the mobile router that includes identification information of another mobile router that is to be a communication destination, searching the mobile router registration information table, based on identification information of the other mobile router, for mobile router information that includes identification information of mobile communication terminals equipped in the other mobile router; and returning the searched mobile router information to the mobile router; and the mobile router: receiving mobile router information that is returned from the mobile router information management server in response to the inquiry information, and initiating communication with the other mobile router based on identification information of mobile communication terminals that are equipped in the other mobile router included in the mobile router information.

Advantageous Effects of the Invention

The present invention enables data transfer between mobile routers without going by way of a home agent and enables a connection to be established with a destination mobile router even when a mobile communication terminal equipped in the destination mobile router has been changed at the time of starting connection to the destination mobile router.

BRIEF DESCRIPTION OF THE DRAWINGS

FIG. 2a shows the configuration of a mobile router information table of the mobile router shown in FIG. 1.

FIG. 2b shows the configuration of the mobile router information table of another mobile router shown in FIG. 1.

FIG. 3 shows the configuration of a registry management server information table of the mobile router shown in FIG. 1.

FIG. 4 shows the configuration of a mobile router registration information table of the management server shown in FIG. 1.

FIG. 16a shows the configuration of an expanded mobile router registration information table.

DESCRIPTION OF THE EMBODIMENTS

Exemplary embodiments of the mobile router information management server, mobile router, the mobile router network that includes these components, and the communication methods of these components according to the present invention will be next described in detail with reference to the accompanying drawings.

The exemplary embodiments of the present invention provide means that places in correspondence and uniformly manages fixed identification information for specifying a mobile router and identification information that is dynamically changed such as user information or identification information for each mobile communication terminal of detachable mobile communication terminals that are equipped in a mobile router. Here, differing terminal types for, for example, wide-area IP network connections or circuit switching network connections or terminals for which the terminal types are the same but for which the user information differs are used as the mobile communication terminals that are equipped in a mobile router. Examples of the user information include, for example, WAN-side IP addresses (care-of addresses) used in wide-area IP network connections or telephone numbers used in circuit switching network connections.

The mobile router network according to the present exemplary embodiment includes mobile routers (including the first and second mobile routers) that can be equipped with detachable mobile communication terminals and a mobile router information management server that can receive control communication from these mobile routers.

Each mobile router is able to register the identification information of its own mobile router and the identification information (including user information) of mobile communication terminals that are equipped in its own mobile router by control communication to a mobile router information management server.

The following operations are carried out in the above-described configuration. In order for a first mobile router to communicate with a second mobile router, the first mobile router first transmits inquiry information including the identification information of the second mobile router to the mobile router information management server. In response to this inquiry information, the mobile router information management server returns the identification information of mobile communication terminals that are equipped in the second mobile router that is registered. The first mobile router, having received this reply from the mobile router information management server, starts communication with the second mobile router based on the identification information of the mobile communication terminals that is contained in the reply.

Details of the present exemplary embodiment are next described taking as an example IP communication that uses a wide-area IP network and a circuit switching network.

Figure 1:
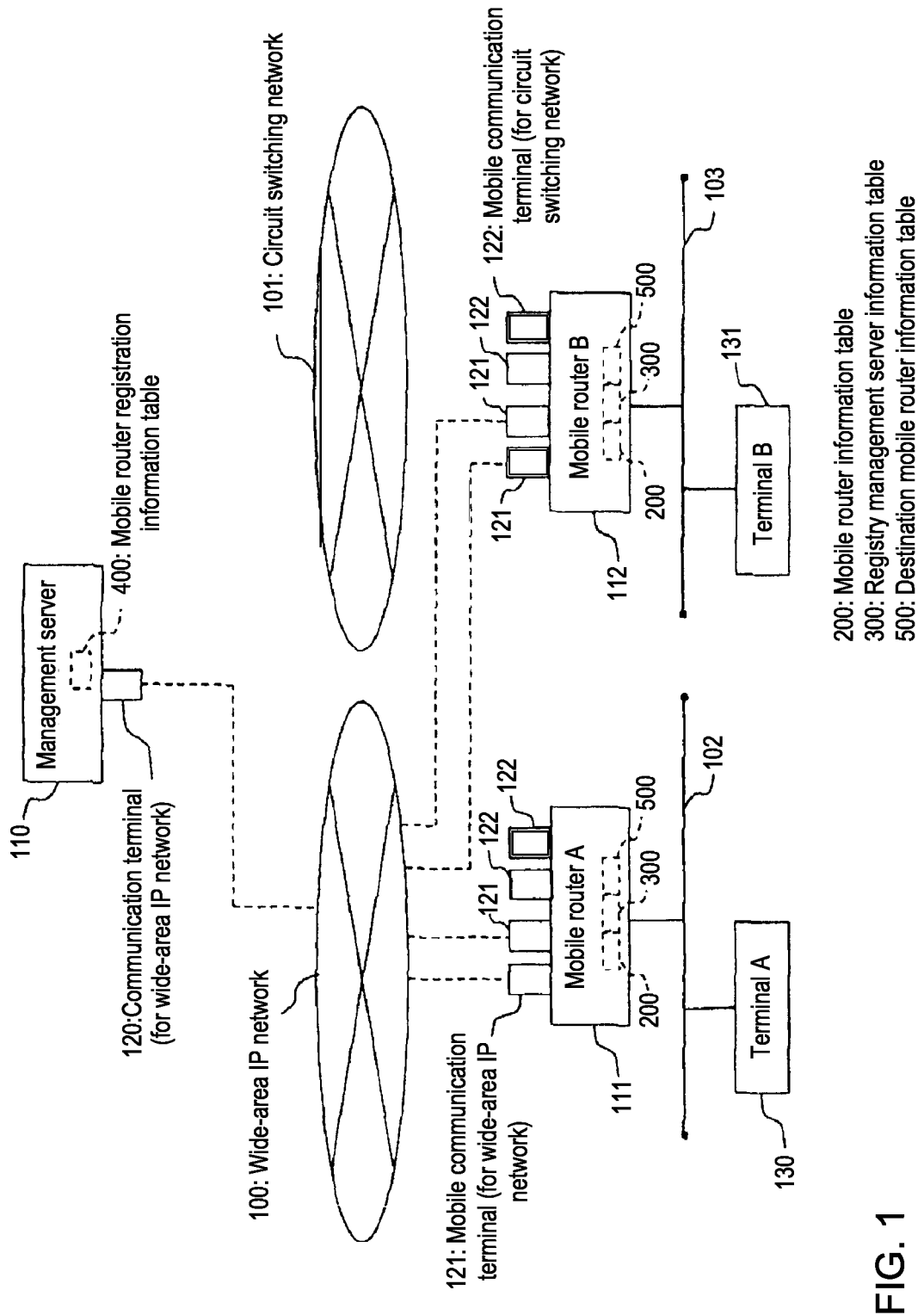
FIG. 1 is a block diagram showing the network configuration of a mobile router network according to an exemplary embodiment of the present invention.

FIG. 1 represents a network configuration diagram when a wide-area IP network and a circuit switching network are used.

A mobile router network including wide-area IP network 100 and circuit switching network 101 shown in FIG. 1 includes: a plurality of mobile routers A 111 and B 112 that can be equipped with detachable mobile communication terminals; and mobile router information management server (hereinbelow abbreviated as "management server") 110 that can communicate with each of mobile routers A 111 and B 112. In the example of FIG. 1, two mobile communication terminals 121 for wide-area IP network connections and two mobile communication terminals 122 for circuit switching network use are shown as detachable mobile communication terminals. In addition, terminal A 130 is connected to LAN 102 on the mobile router A 111 side, and terminal B 131 is connected to LAN 103 on the mobile router B 112 side.

Management server 110 has the capability of using communication terminal 120 to connect to wide-area IP network 100.

Each of mobile routers A 111 and B 112 has a function of using mobile communication terminal 121 to connect to wide-area IP network 100, and a function of using mobile communication terminal 122 to connect to circuit switching network 101 that is a network different from wide-area IP network 100.

Each of mobile routers A 111 and B 112 is able to use mobile IP to establish a connection between mobile routers A 111 and B 112 by way of wide-area IP network 100 or by way of circuit switching network 101, and has the function of using local IP addresses to carry out communication between terminal A 130 on the mobile router A 111 side and terminal B 131 on the mobile router B 112 side.

FIGS. 2a and 2b show mobile router information tables 200 of mobile router A 111 and mobile router 112, respectively. FIG. 2a shows mobile router information table 200 of mobile router A 111, and FIG. 2b shows mobile router information table 200 of mobile router B 112. As the mobile router information of its own mobile router, identification information 1 for identifying its own mobile router, identification information 2 of mobile communication terminals that are equipped in its own mobile router, and the effective interval of the mobile router information are set and stored in each of mobile router information tables 200 shown in FIGS. 2a and 2b.

Each of mobile routers A 111 and B 112 has: the function of setting and storing in mobile router information table 200 the "home address (LAN-side IP address)" and "router name" of the mobile router itself as identification information 1 for identifying its own mobile router; and the function of automatically acquiring "care-of addresses (WAN-side IP address)" that have been acquired as identification information 2 of mobile communication terminals at the time that mobile communication terminals 121 established a link and "telephone numbers" that are held in mobile communication terminals at the time of equipping mobile communication terminals 122, and storing this information as user information in mobile router information table 200.

FIG. 3 shows registry management server information table 300 of mobile routers A 111 and B 112.

Each of mobile routers A 111 and B 112 is provided with a function of setting and storing, by manual operation, registry management server information table 300 shown in FIG. 3, a function of referring to registry management server information table 300 and transmitting the mobile router information of its own mobile router information table 200 shown in FIGS. 2a and 2b to management server 110 by using IP packets via wide-area IP network 100, and a function of again automatically transmitting the latest mobile router information to management server 110 at the time of a periodic update or when a change occurs in user information or the identification information of the equipped mobile communication terminals (identification information 2).

FIG. 4 shows mobile router registration information table 400 of management server 110 and shows characteristics of the present invention.

Management server 110 is provided with a function of holding, as mobile router registration information table 400 shown in FIG. 4, mobile router information that is reported by using IP packets from each of mobile routers A 111 and B 112, a function of managing the "hold interval" of mobile router information, and a function of using IP packets to transmit the registration results to the transmission source.

Mobile router registration information table 400 shown in FIG. 4 holds "router names" as identification information 1 for identifying mobile routers and "home addresses (LAN-side IP address)" of networks with which management server 110 is unable to directly communicate.

Mobile router registration information table 400 holds in association as identification information 2 of mobile communication terminals that are equipped in the mobile router and have the potential for being dynamically changed: user information "care-of addresses (WAN-side IP Address)" for communicating by wide-area IP network 100 and user information "telephone numbers" of circuit switching network 101 with which management server 110 cannot connect, as communication means that can be used in the same data transfer.

This enables the management of "router names" that identify mobile routers in association with "care-of addresses (WAN-side IP Address)" by which communication via a wide-area IP network is possible that has been described as a past issue, and further, enables storing in a management server "router names" identifying mobile routers in association with "telephone numbers" that are required for connecting with destinations via a circuit switching network (a network that can be used only between mobile routers).

In other words, in mobile router registration information table 400 of management server 110, "home addresses (LAN-side IP address)" of networks with which management server 110 cannot communicate, a plurality of mobile communication terminals equipped in mobile routers, and "telephone numbers" of mobile communication terminals that are communication means with which management server 110 is not compatible can be uniformly managed as a plurality of communication means that can simultaneously perform data transfer for each mobile router with "router names" that identify mobile routers as a key.

In addition, by updating the information of management server 110 that places identification information 2 (mobile communication terminal), which changes dynamically, in association with fixed identification information 1 of a mobile router, management server 110 is able to always grasp which mobile routers (identification information 1) holds which mobile communication terminals (identification information 2) and is able to make the best use of the mobility of mobile communication terminals among mobile routers even when a mobile communication terminal that has inherent user information (a telephone number) is relocated to another mobile router.

Figure 5A:
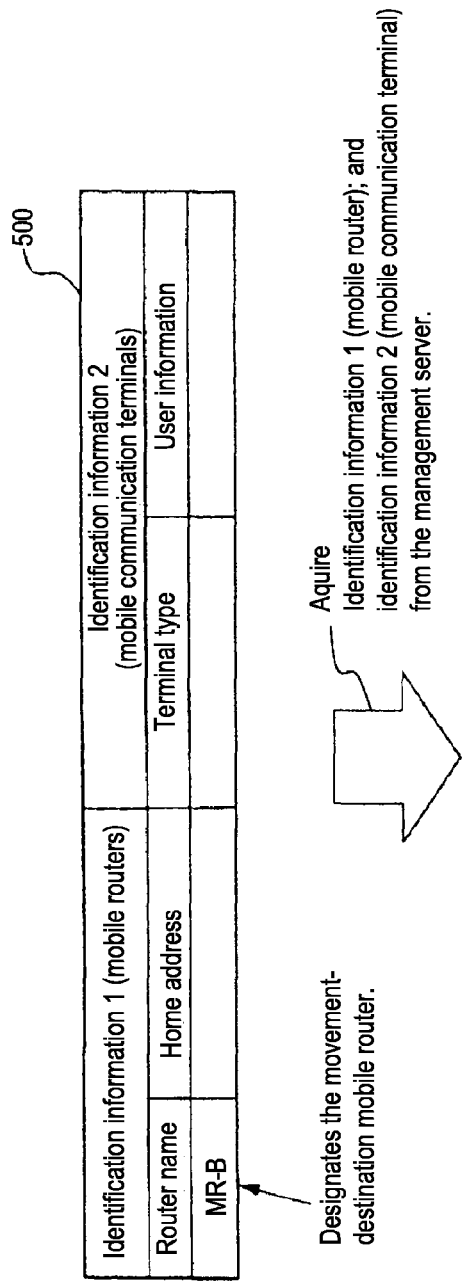
FIG. 5a shows destination mobile router information table 500 before registration of mobile router information in the mobile router shown in FIG. 1.
Figure 5B:
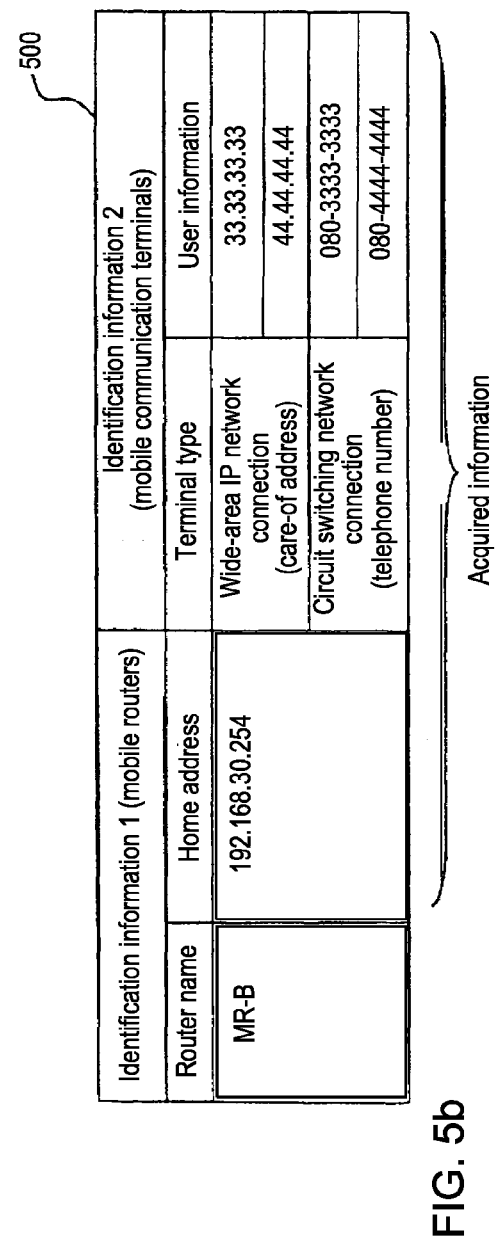
FIG. 5b shows destination mobile router information table 500 after registration of mobile router information in the mobile router shown in FIG. 1.

FIGS. 5a and 5b show destination mobile router information table 500 of mobile router A 111. FIG. 5a shows destination mobile router information table 500 before registration of mobile router information, and FIG. 5b shows destination mobile router information table 500 after registration of mobile router information.

Mobile router A 111 is provided with a function of manually setting and storing the "router name" of a destination mobile router in destination mobile router information table 500 shown in FIG. 5a, and a function of referring to the "router name" of destination mobile router information table 500 and using IP packets to issue an inquiry to management server 110 via wide-area IP network 100 with the "router name" as a key.

Management server 110 is provided with a function of searching mobile router registration information table 400 shown in FIG. 4 that is held inside management server 110 using as a key the "router name" that is the identification information of the mobile router for which an inquiry has been issued using IP packets from mobile router A 111, and a function of using IP packets to transmit, to the transmission source mobile router, information that pertains to the "router name" that has been used as a key.

Mobile router A 111 is provided with a function of storing the mobile router information of mobile router B 112 that has been reported from management server 110 using IP packets in destination mobile router information table 500 shown in FIG. 5b.

In this way, a mobile router, by acquiring mobile router information of a destination mobile router, is able to hold mobile communication terminals equipped in the destination mobile router, and then user information for each mobile communication terminal. As a result, when carrying out data transfer between mobile routers, communication is possible via a shared network by which the mobile router itself and the destination mobile router can connect.

In this example, each of mobile routers A 111 and B 112 becomes a communication means that can use the two types of networks, wide-area IP network 100 and circuit switching network 101, and can identify the user information "care-of addresses (WAN-side IP Address)" for wide-area IP network connection use as the destination mobile router when each of mobile routers A 111 and B 112 uses wide-area IP network 100, and can identify the user information "telephone numbers" for circuit switching network connection use as the destination mobile router when each of mobile routers A 111 and B 112 uses circuit switching network 101. As a result, each of mobile routers A 111 and B 112 is able to communicate via both networks when transmitting data.

In this way, by sharing user information for each mobile communication terminal for communication means that can be used only between mobile routers or even communication means that management server 110 is unable to use, data transfer can be carried out using not only one communication means but a plurality of communication means as the communication means used in data transmission between each of mobile routers A 111 and B 112 without limitation to the communication means of the management server.

In the present exemplary embodiment, management server 110, by holding and updating identification information for identifying mobile routers in association with the identification information of a plurality of different mobile communication terminals that changes dynamically, is able to use the identification information for identifying mobile routers and even the user information of mobile communication terminals that changes dynamically to share among all mobile routers.

Figure 6:
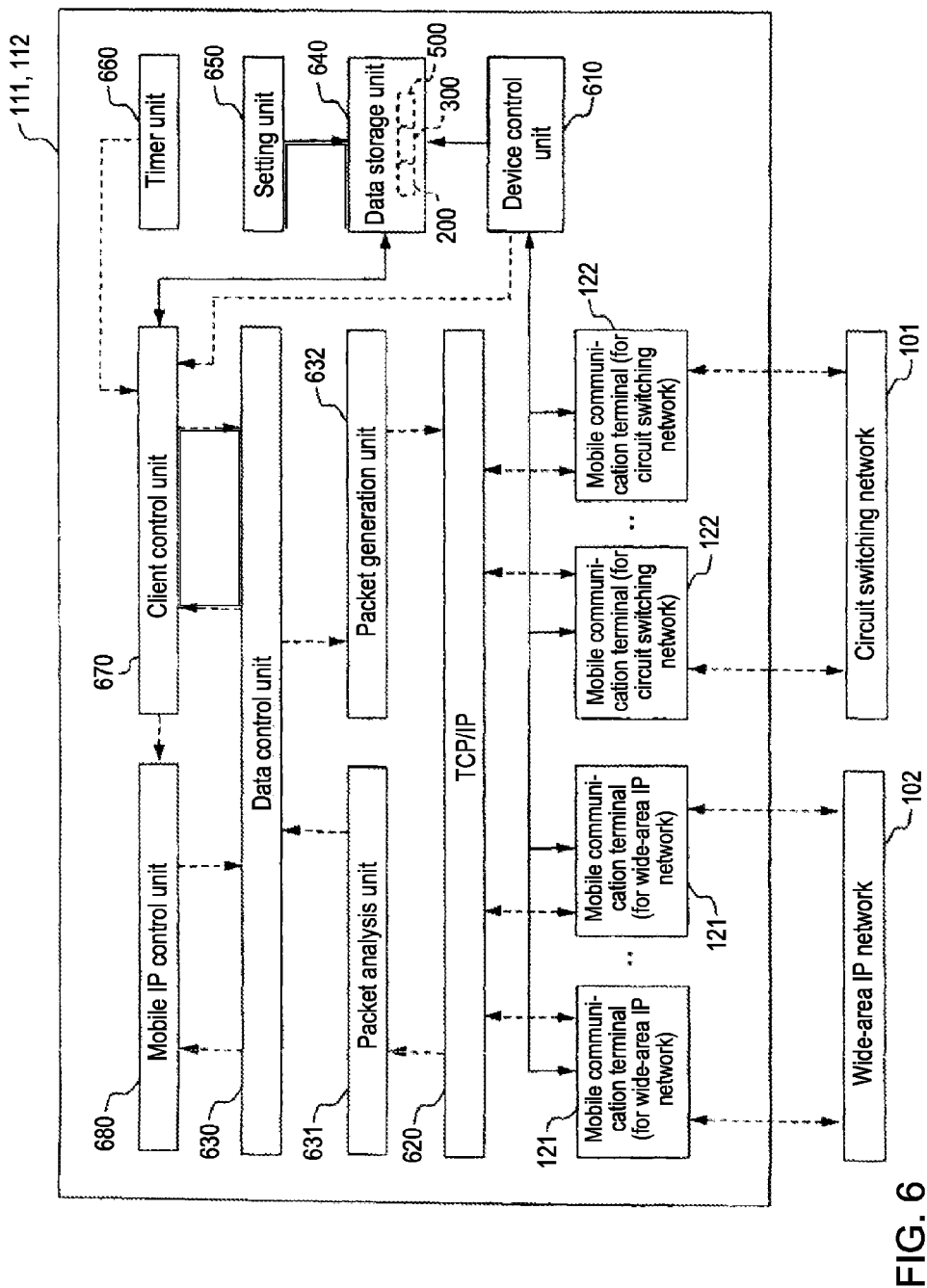
FIG. 6 is a schematic block diagram showing the internal configuration of the mobile router shown in FIG. 1.

FIG. 6 shows the internal configuration of mobile routers A 111 and B 112 shown in FIG. 1.

Each of mobile routers A 111 and B 112 shown in FIG. 6 includes device control unit 610, TCP/IP 620, data control unit 630, packet analysis unit 631, packet generation unit 632, data storage unit 640, setting unit 650, timer unit 660, client control unit 670, and mobile IP control unit 680. Of these, device control unit 610 and client control unit 670 mainly make up the principal parts of the control means of mobile router according to the present invention.

Data storage unit 640 is made up by: mobile router information table 200 (see FIG. 2) for managing the mobile router information of the mobile router itself, registry management server information table 300 (see FIG. 3) for carrying out communication with management server 110, and destination mobile router information table 500 (see FIG. 5) for managing the mobile router information of the destination mobile router.

Setting unit 650 is a user interface and is a module having a function by which a user changes each information table 200 stored in data storage unit 640.

Device control unit 610 is a module having a function of using mobile communication terminal 121 to automatically start a connection to wide-area IP network 100, a function of detecting the establishment or break of a link, and a function of storing the IP address that has been acquired at the time of establishing a link to its own mobile router information table 200 of data storage unit 640 as a "care-of address (WAN-side IP Address)."

In addition, device control unit 610 is a module having a function of storing, as "telephone number" in mobile router information table 200 of data storage unit 640, its own "telephone number" that is held inside a mobile communication terminal at the time equipping mobile communication terminal 120 for circuit switching use, and a function of using mobile communication terminal 612 for circuit switching use to designate a telephone number and starting call origination or cut-off.

Data control unit 630 is a module having a function of distributing received data.

Packet analysis unit 631 is a module having a function of analyzing IP packets received from wide-area IP network 100 or circuit switching network 101.

Packet generation unit 632 is a module having a function of generating IP packets that are scheduled for transmission.

Timer unit 660 is a module having a function of implementing time management for periodic updating of network information of its own mobile router to management server 110, and a function of reporting to client control unit 670 before updating the "effective interval" that is set in mobile router information table 200 of its own mobile router shown in FIG. 2a or FIG. 2b.

Client control unit 670 is a module having a function of transmitting to management server 110 all information of mobile router information table 200 of its own mobile router that is stored in data storage unit 640 as a registration request (registration request message), a function of transmitting to management server 110 a "router name" of destination mobile router information table 500 as an inquiry request (inquiry request message), a function of storing the inquiry result received from management server 100 in destination mobile router information table 500, and a function of transmitting a report of acquisition of connection destination information to mobile IP control unit 680.

All of the content of mobile router information table 200 of its own mobile router shown in FIG. 2 is contained in the above-described registration request message. In addition, the "router name" of destination mobile router information table 500 shown in FIG. 5 is contained in the above-described inquiry request message.

Using a group of the above-described modules enables registration of the most recent mobile router information to management server 110, and in addition, enables inquiry with "router name" designated and acquisition of the most recent mobile router information of the "router name" that pertains to this designated "router name."

Figure 7:
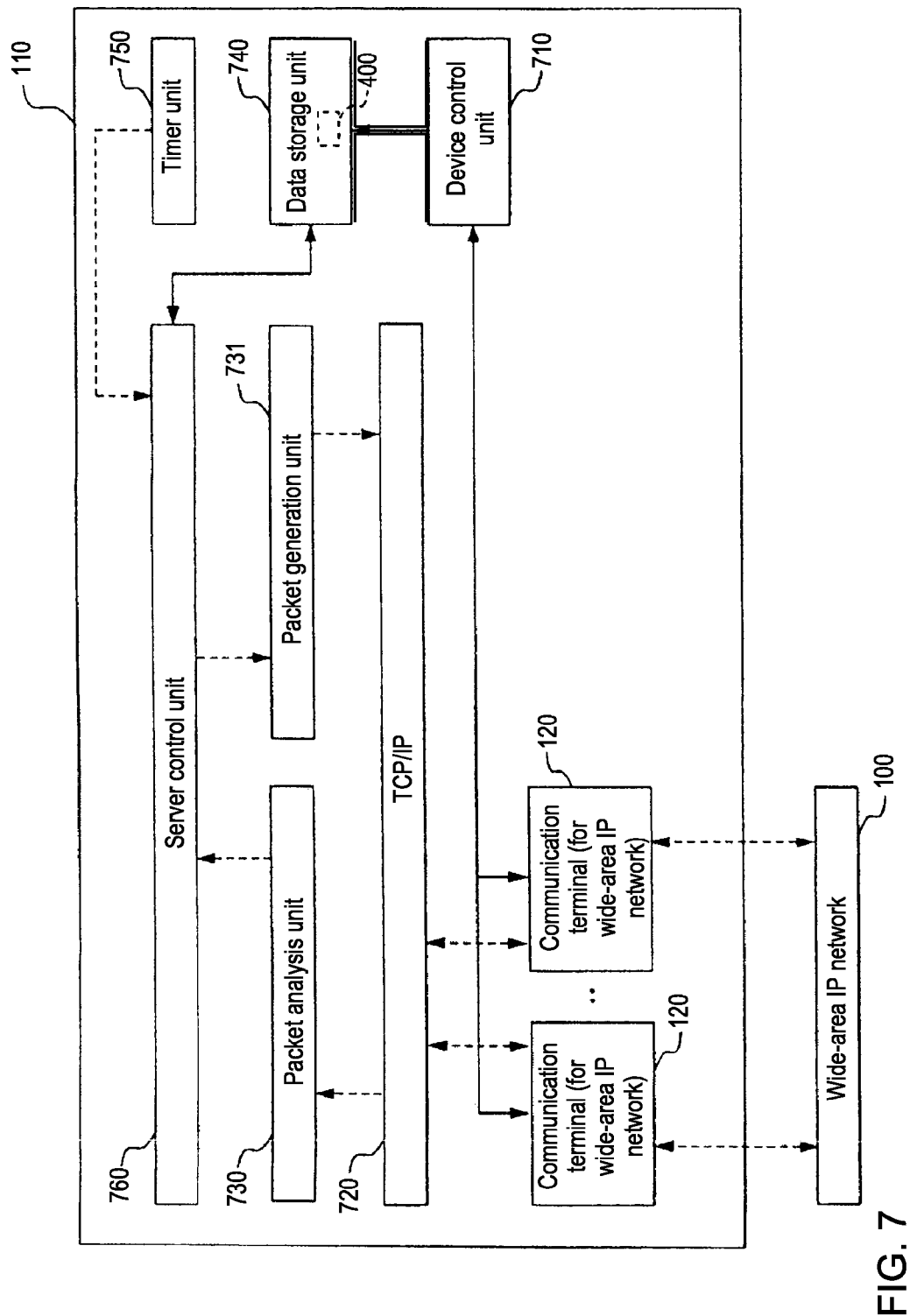
FIG. 7 is a schematic block diagram showing the internal configuration of the management server shown in FIG. 1.

FIG. 7 shows the internal configuration of management server 110 shown in FIG. 1.

Management server 110 shown in FIG. 7 includes: device control unit 710, TCP/IP 720, packet analysis unit 730, packet generation unit 731, data storage unit 740, timer unit 750, server control unit 760, and mobile IP control unit 680. Of these components, device control unit 710 and server control unit 760 mainly make up the principal components of the control means of the mobile router information management server according to the present invention.

Data storage unit 750 is made up by mobile router registration information table 400 (see FIG. 4) for managing mobile router information reported in by each mobile router.

Device control unit 710 is a module having a function of using communication terminal 120 to automatically start a connection to wide-area IP network 100.

Packet analysis unit 730 is a module having a function of analyzing IP packets received from wide-area IP network 100.

Packet generation unit 731 is a module having a function of generating IP packets that are scheduled for transmission.

Timer unit 750 is a module having a function of implementing time management for monitoring the "hold interval" of mobile router information from each of mobile routers A 111 and B 112, and a function of reporting to server control unit 760 that a hold interval has expired at the time of expiration of the hold interval that is set in mobile router registration information table 400 shown in FIG. 4.

Server control unit 760 is a module having a function of storing, in mobile router registration information table 400, mobile router information that has been reported from each of mobile routers A 111 and B 112, a function of starting the timer upon receiving an effective interval reported as mobile router information, a function of transmitting registration results to the transmission source, a function of searching mobile router registration information table 400 held in management server 110 for mobile router information that pertains to the "router name" with "router name" as a key in response to inquiries from each of mobile routers A 111 and B 112, a function of reporting the search result (inquiry result message) as mobile router information to the transmission source, and a function of, when there is no periodic update of network information within the hold interval of mobile router registration information table 400, deleting the relevant mobile router information.

The above-described inquiry result message contains all of the content that has been placed in association with the relevant "router name" in mobile router registration information table 400 shown in FIG. 4.

Using a group of the above-described modules enables uniform management of identification information for identifying each of mobile routers A 111 and B 112 and identification information of the plurality of different communication means and connection accounts that are capable of simultaneous data transfer, for each item of identification information for identifying mobile routers.

The operation of the present exemplary embodiment is next described.

Figure 8:
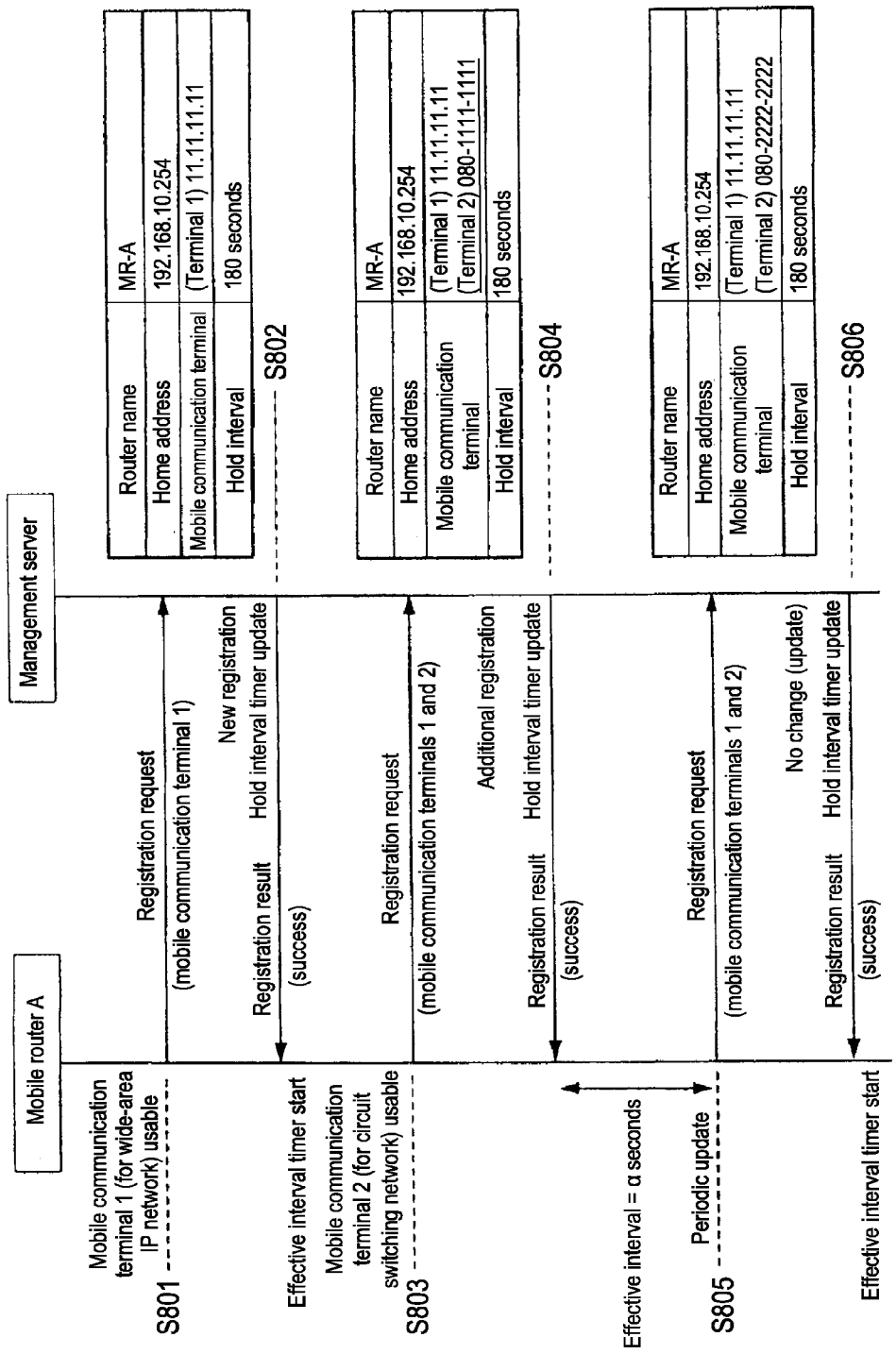
FIG. 8 is a view for describing the sequence when newly registering, updating, and deleting mobile router information between a mobile router and a management server when a mobile communication terminal of the mobile router shown in FIG. 1 can be used.
Figure 9:
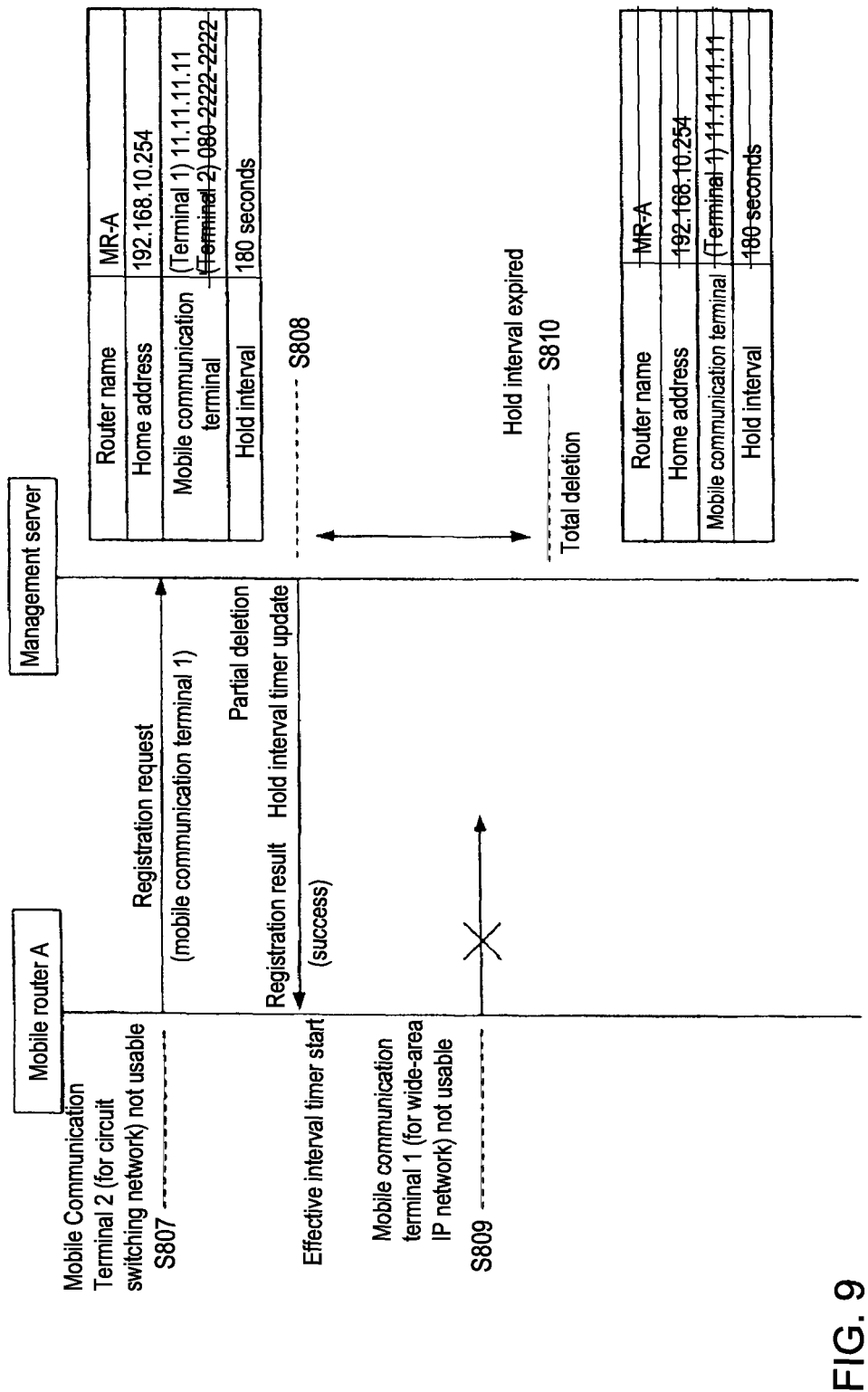
FIG. 9 is a view for describing the sequence when newly registering, updating, and deleting mobile router information between the mobile router and the management server when the mobile communication terminal of the mobile router shown in FIG. 1 cannot be used.

FIGS. 8 and 9 show sequences of the new registration, updating, and deletion of mobile router information of mobile router A 111 and management server 110.

As shown in FIG. 8, when the identification information of mobile communication terminal 1 has been acquired, mobile router A 111 transmits the information of mobile communication terminal 1 to management server 110 as a registration request (Step S801). This registration request message contains all information of mobile router information table 200 of the mobile router itself shown in FIG. 2.

Management server 110 holds the identification information for identifying mobile router A 111 and the identification information of mobile communication terminal 1 that has become usable by the mobile router, and after starting the timer with the effective interval that has been reported from the mobile router as the hold interval of the identification information, transmits the registration result to mobile router A 111 (Step S802).

On the other hand, when the identification information of mobile communication terminal 2 is acquired, mobile router A 111 transmits the information of mobile communication terminal 1 and mobile communication terminal 2 as a registration request to management server 110 (Step S803).

Management server 110 holds each of identification information for identifying mobile router A 111 and the identification information of mobile communication terminal 1 and mobile communication terminal 2 that can be used by a mobile router and, after starting a timer with an effective interval that has been reported as the hold interval, transmits the registration result to mobile router A 111 (Step S804).

Before the effective interval expires, mobile router A 111 transmits to management server 110 identification information of each of mobile communication terminal 1 and mobile communication terminal 2 (the same information as at the time of the previous transmission) as a registration request (Step S805).

Management server 110 holds each of the identification information for identifying mobile router A 111 and the identification information of mobile communication terminal 1 and mobile communication terminal 2 that have become usable by the mobile router, and after starting the timer with the effective interval that has been reported as the hold interval, transmits the registration result to mobile router A 111 (Step S806).

As shown in FIG. 9, when mobile communication terminal 2 becomes unusable, mobile router A 111 transmits information of only mobile communication terminal 1 as a registration request (Step S807).

Management server 110 holds the identification information for identifying mobile router A 111 and the identification information of mobile communication terminal 1 that the mobile router can currently use and deletes the identification information of mobile communication terminal 2. In addition, after starting the timer with the effective interval reported from mobile router A 111 as the hold interval, management server 110 transmits the registration result to mobile router A 111 (Step S808).

When mobile communication terminal 1 becomes unusable, mobile router A 111 does not transmit a registration request to management server 110 because there is no mobile communication terminal that can transmit the registration request to management server 110 (Step S809).

As a result, management server 110 is unable to receive the registration request that is periodically updated from mobile router A 111, the hold interval timer expires, and all mobile router information including identification information for identifying mobile router A 111 is deleted (Step S810).

By handling the above-described sequences, management server 110 is always able to manage, for each mobile router, the most recent mobile communication terminal information that can be connected by using as a key the "router name" that is identification information for identifying a mobile router.

Figure 10:
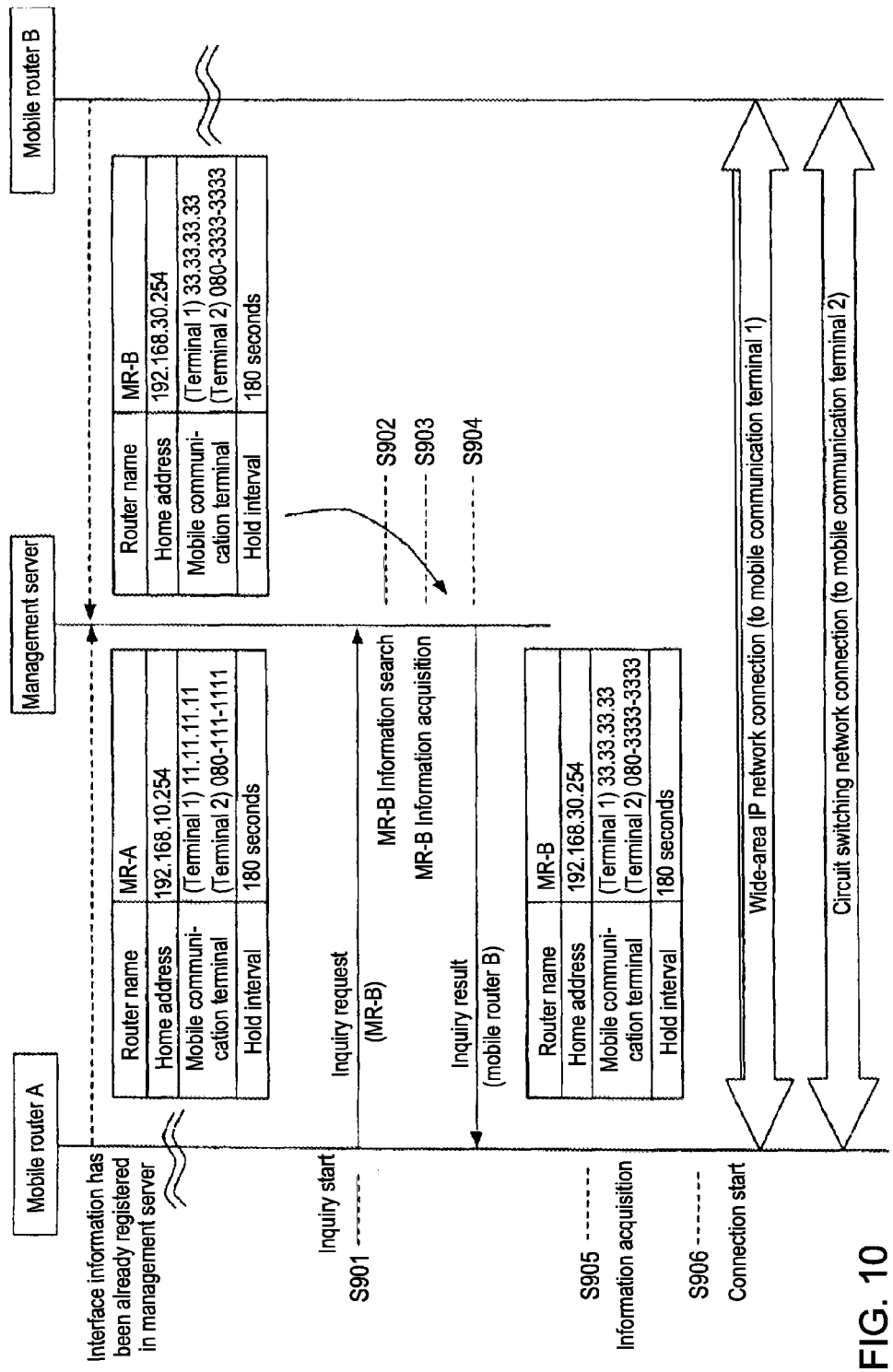
FIG. 10 is a view for describing the sequence when the mobile router shown in FIG. 1 acquires mobile router information of another mobile router from the management server.

FIG. 10 shows the sequence when mobile router A 111 acquires the mobile router information of mobile router B 112 from management server 110. It is here assumed that the registration of mobile router information shown in FIG. 8 has been completed with respect to mobile router A 111 and mobile router B 112.

As shown in FIG. 10, in order to start a connection with mobile router B 112, mobile router A 111 transmits an inquiry request to management server 110 using the "router name" that is the identification information for identifying mobile router B 112 as a key (Step S901).

The "router name" of destination mobile router information table 500 shown in FIG. 5 is contained in the above-described inquiry request message.

In response to the above-described inquiry request, management server 110 carries out a search of mobile router information from mobile router registration information table 400 shown in FIG. 4 using "router name" as a key (Step S902) and acquires the search result (Step S903). Management server 110 then transmits the inquiry result to the transmission source (Step S904).

The above-described inquiry result message includes all identification information of a plurality of mobile communication terminals capable of simultaneous data transfer that have been placed in correspondence with the relevant "router name" in mobile router registration information table 400 shown in FIG. 4.

Mobile router A 111 stores the inquiry result (Step S905), whereby when the identification information of mobile communication terminals is included, the mobile communication terminal information for carrying out communication with mobile router B 112 can be acquired by storing the inquiry result in destination mobile router information table 500 shown in FIG. 5. As a result, mobile router A 111 is able to use a plurality of different mobile communication terminals capable of communicating with each other to start a mobile IP connection with mobile router B 112 (Step S906).

By handling the above-described sequence, mobile router A 111 is able to acquire in real time the most recent mobile router information for realizing a mobile IP connection with mobile router B 112.

Figure 11:
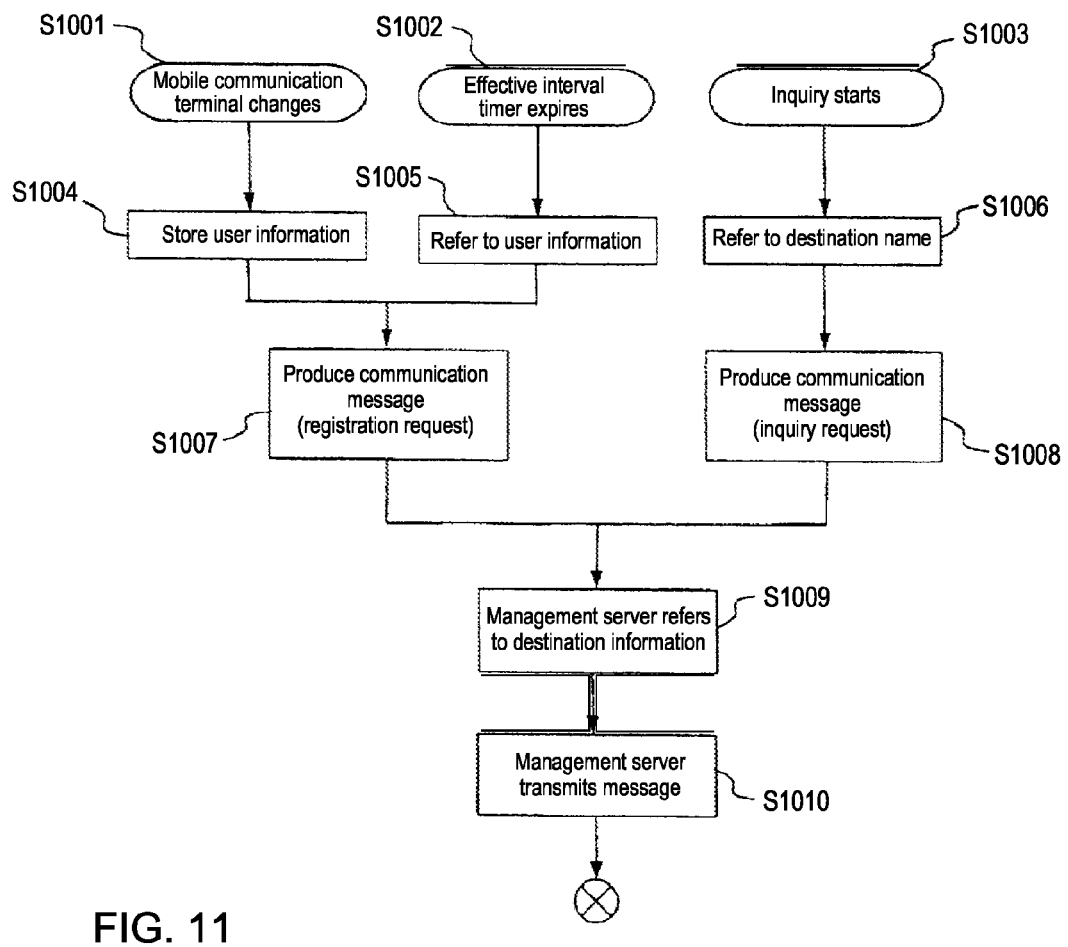
FIG. 11 is a schematic flow chart for describing the internal flow of the mobile router up to the transmission of a message to the management server shown in FIG. 1.

FIG. 11 shows the internal flow up to the transmission of messages to management server 110 by each of mobile routers A 111 and B 112.

As shown in FIG. 11, when a mobile communication terminal has been changed (Step S1001), each of mobile routers A 111 and B 112 stores the identification information of mobile communication terminals in mobile router information table 200 of its own mobile router shown in FIG. 2 (Step S1004) and produces all of the saved information as a registration request message (Step S1007).

Alternatively, when the timer of the effective interval has expired (Step S1002), each of mobile routers A 111 and B 112 refers to the information stored in mobile router information table 200 shown in FIG. 2 (Step S1005) and produces all stored information as a registration request message (Step S1007).

Further, when starting a mobile IP connection, each of mobile routers A 111 and B 112 issues an inquiry to management server 110 (Step S1003). For this purpose, each of mobile routers A 111 and B 112 refers to destination mobile router information table 500 shown in FIG. 5 (Step S1006) and produces an inquiry request message for the "router name" for which the "home address (LAN-side IP address)" of identification information 1, as well as the "terminal type" and "user information" of identification information 2 are not stored (Step S1008).

Next, when using mobile communication terminal 121 to transmit a registration request message or inquiry request message to management server 110, each of mobile routers A 111 and B 112 refers to the "user information" of registry management server information table 300 shown in FIG. 3 (Step S1009). Each of mobile routers A 111 and B 112 then uses IP packets to transmit the registration request message or the inquiry request message to management server 110 by way of wide-area IP network 100 (Step S1010).

Figure 12:
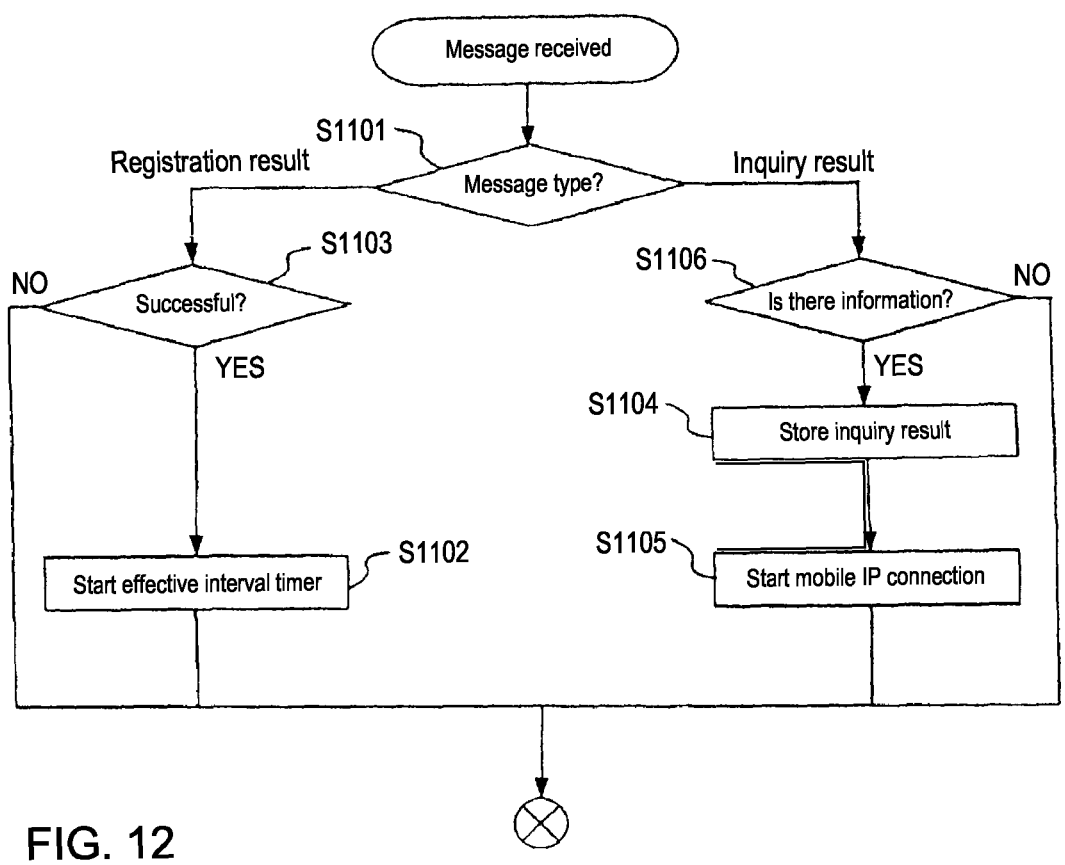
FIG. 12 is a schematic flow chart for describing the internal flow of the mobile router after receiving a message from the management server shown in FIG. 1.

FIG. 12 shows the internal flow of a mobile router after each of mobile routers A 111 and B 112 has received a message from management server 110.

As shown in FIG. 12, each of mobile routers A 111 and B 112 refers to the message type that has been received as IP packets from management server 110 and judges whether the message is a registration result or inquiry result (Step S1101).

As a result, when the received message is a registration result (Step S1101: registration result), each of mobile routers A 111 and B 112 judges whether the registration result is a success or a failure (Step S1103). If the registration result is a success (Step S1103: YES), each of mobile routers A 111 and B 112 starts the effective interval timer for periodic update (Step S1102), and in the event of failure (Step S1103: NO) judges that the registration to management server 110 has not been possible and terminates the process at this point.

On the other hand, when the received message is an inquiry result (Step S1101: inquiry result), each of mobile routers A 111 and B 112 judges whether acquisition of the identification information of mobile communication terminals of the relevant mobile router has been achieved (Step S1106).

As a result, if the identification information of the mobile communication terminal of the relevant mobile router could be acquired (Step S1106: YES), each of mobile routers A 111 and B 112 stores the acquired result in the destination mobile router information table 500 shown in FIG. 5*a* and FIG. 5*b* (Step S1104), and uses this mobile router information to start a connection to the relevant mobile router (Step S1105).

When unable to acquire identification information of mobile communication terminals of the relevant mobile router (Step S1106: NO), each of mobile routers A 111 and B 112 is able to judge that the mobile router for which connection is attempted is in a state of being unable to communicate and therefore simply terminates the process.

Figure 13:
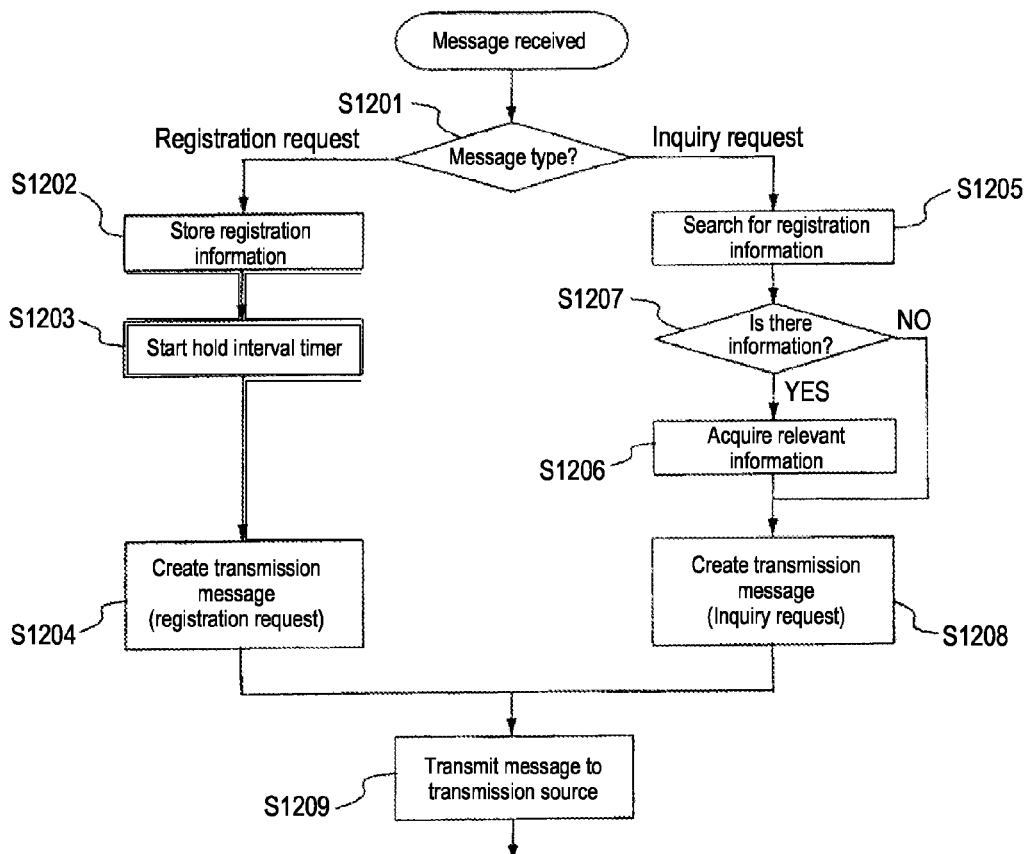
FIG. 13 is a schematic flow chart for describing the internal flow of the management server after receiving the message from the mobile router shown in FIG. 1.

FIG. 13 shows the internal flow of a mobile router after management server 110 has received a message from each of mobile routers A 111 and B 112.

As shown in FIG. 13, management server 110 refers to the message type received as IP packets from each of mobile routers A 111 and B 112 and judges whether the message is a registration request or an inquiry request (Step S1201).

As a result, when the received message is a registration request (Step S1201: registration request), management server 110 stores the reported information in mobile router registration information table 400 shown in FIG. 4 with "router name" as a key (S1202). Management server 110 then, after starting the timer with the effective interval reported from the mobile router as the "hold interval," creates a registration result message (Step S1204).

On the other hand, when the received message is an inquiry request (Step S1201: inquiry request), management server 110 searches mobile router registration information table 400 shown in FIG. 4 with "router name" as a key (Step S1205) and judges whether relevant mobile router information is present (Step S1207).

If, as a result, relevant mobile router information is present (Step S1207: YES), management server 110 acquires all of the relevant information (S1206) and creates an inquiry result message (Step S1208). In other words, this case means that the mobile router that is the object of the inquiry is in a state that allows communication.

On the other hand, if relevant mobile router information is not present (Step S1207: NO), management server 110 adds only "router name" to create an inquiry result message (Step S1208). In other words, this case means that the mobile router that has been the object of the inquiry is in a state that does not allow communication (for example, the power supply is OFF).

Management server 110 next uses IP packets to transmit the registration result message created in Step S1204 or the inquiry result message created in Step S1208 to the transmission source (Step S1209).

Figure 14:
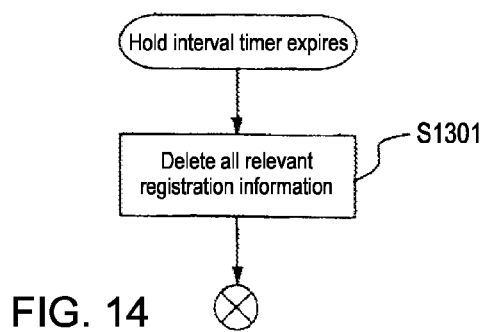
FIG. 14 is a schematic flow chart for describing the internal flow of the management server when the hold interval of information that is registered in the management server shown in FIG. 1 has expired.

FIG. 14 shows the internal flow when the hold interval of the information that is registered in management server 110 expires.

As shown in FIG. 14, when the hold interval for relevant registration information has expired, management server 110 deletes all of the relevant information in mobile router registration information table 400 shown in FIG. 4 (Step S1301). In other words, this case means that a mobile router capable of communication up to this point has entered a state that does not allow communication (for example, a state in which the power supply is OFF or a state (out of service) in which radiowave of a base station (not shown in the figure) cannot be received).

By means of the present exemplary embodiment as described hereinabove, the necessity for a home agent is eliminated, thereby enabling a solution to the problem in a conventional network configuration whereby communication between all mobile routers cannot be realized during the occurrence of a fault in the home agent.

Still further, by means of the present exemplary embodiment, a management server is able to uniformly manage the information of a plurality of different mobile communication terminals capable of simultaneous data transfer for each mobile router and can acquire, in real time, information of mobile communication terminals that are currently able to communicate of a destination mobile router simply by designating only "router name" as the setting relating to the destination mobile router.

Therefore, the dynamic acquisition of mobile router information of a destination mobile router by a mobile router eliminates the need to acquire the information beforehand by another means even when a detachable mobile communication terminal relocates to another mobile router, when a mobile communication terminal is newly added, or when the user information of the mobile communication terminal is changed.

As a result, the present exemplary embodiment has the effect of eliminating the necessity of setting, for example, complicated IP addresses, whereby the task of setting a connection destination can be simplified and the burden of the setting task by a user can be relieved.

A management server can achieve uniform management of the information of communication means with which the management server itself cannot connect even for a network that can be used only among mobile routers. The present exemplary embodiment provides expandability to a network that can realize connections between mobile routers.

Although only one "router name" is designated as the inquiry request to management server 110 in FIG. 10, the present invention is not limited to this form, and, for example, one IP packet may be used to designate and transmit a plurality of "router names," or a plurality of items of network information may be transmitted using one packet regarding an inquiry result from management server 110.

The present embodiment may also be provided with a means that, in the inquiry shown in FIG. 10, inquires by designating not only the "router name" but also by designating the "home address (LAN-side IP address)" (more than one being possible). This is because the "home address (LAN-side IP address)" can also be used as identification information for identifying a mobile router.

For example, at the timing at which terminal A 130 shown in FIG. 1 starts communication (packet transmission) with terminal B 131, mobile router A 111 refers to the destination of IP packets transmitted from terminal A 130 and uses the "home address (LAN-side IP address)" to submit an inquiry to management server 110.

In this way, mobile router A 111 is able to connect on demand to mobile router B 112.

Further, the present exemplary embodiment may also be provided with means that adds the network information of its own management server to the registration result shown in FIG. 8 and FIG. 9 that management server 110 transmits, and means that sets or updates the network information of management server 110 acquired by each of mobile routers A 111 and B 112 in registry management server information table 300 shown in FIG. 3.

Figure 15:
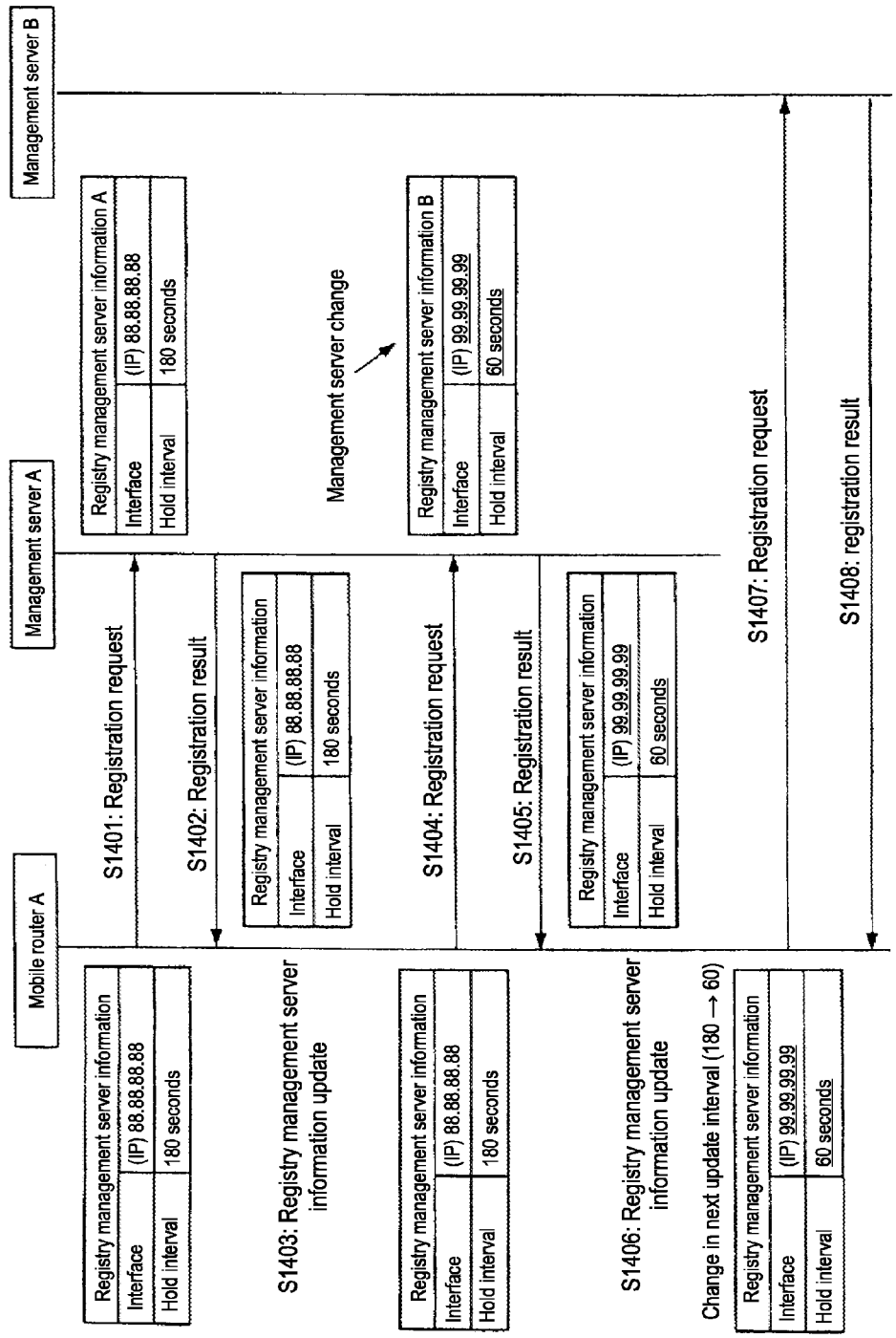
FIG. 15 is a view for describing the sequence when the management server adds network information of the management server itself to a registration result that is shown in FIGS. 8 and 9 and transmitted, and updates this network information to the registry management server information table of the mobile router.

For example, in FIG. 15, network information of the management server itself is added to the registration result from management server A (Step S1402) for the registration requests that are periodically transmitted from each mobile router (Step S1401). By means of this procedure, each mobile router is able to automatically update registry management server information table 300 shown in FIG. 3, thereby eliminating the need for changing the settings of each mobile router when the network information of management server A is changed.

In addition, management server A adds network information of the management server to the registration result (Step S1405) for the registration requests (Step S1404) that are periodically transmitted from each mobile router. At this time, management server A adds the network information of management server B different from management server A as the network information of the management server and shortens the hold interval (for example, from 180 seconds to 60 seconds). By adopting this procedure, each mobile router is able to automatically update registry management server information table 300 shown in FIG. 3 and automatically switch from management server A to management server B in a short time interval, and is able to register the most recent network information in management server B (Steps S1407 and 1408).

In this way, periodic maintenance, repair, and version updating in management server A can be carried out even during operations by automatically switching from management server A to management server B without changing the settings of each of mobile routers A 111 and B 112.

Although management server 110 is described as a dedicated apparatus in FIG. 1, the functions of management server 110 may be provided in a mobile router in the present exemplary embodiment.

In this way, the management server functions can be operated by the same hardware, and moreover, by enabling mobile IP connections, the number of installed hardware components can be reduced and the communication interface can be effectively utilized.

Still further, the present exemplary embodiment may be provided with means that adds authentication information to a registration request for management server 110 shown in FIG. 8 and FIG. 9 and to an inquiry request for the management server shown in FIG. 10.

Means may be provided that, by using this authentication information, encrypts IP packets that are transmitted and received between each of mobile routers A 111 and B 112 and management server 110.

Figure 16A:
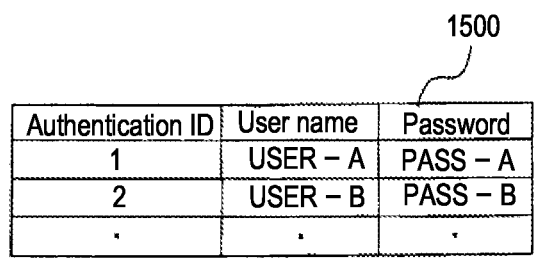
FIG. 16a shows an authentication information table for adding authentication information to a registration request issued to the management server shown in FIGS. 8 and 9 and to an inquiry request issued to the management server shown in FIG. 10.
Figure 16B:
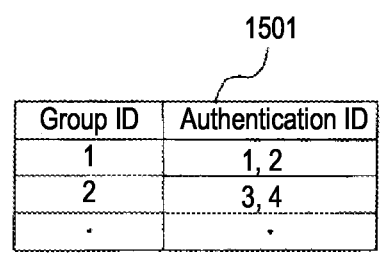
FIG. 16b shows an association table for grouping the authentication information.
Figure 16C:
FIG. 16c shows an expanded mobile router registration information table in which a group ID of the authentication information is associated with each mobile router.

For example, as shown in FIG. 16*a* and FIG. 16*b*, in a management server, authentication information table 1500 (see FIG. 16*a*) is used to define authentication information for each user, correspondence table 1501 (see FIG. 16*b*) is used to establish correspondence with authentication ID that carries out grouping for each group ID. As shown in FIG. 16*c*, extended mobile router registration information table 1502 in which mobile router registration information table 400 shown in FIG. 4 has been extended is used to implement correspondence of group IDs for each mobile router (identification information 1).

In this way, authentication information is used in one management server 110 to carry out grouping, whereby only network information within the same group can be limited to report to an inquiry, and further, improper access can be controlled. As a result, the operation of one management server (hardware) can provide service to a plurality of businesses or the like.

In addition, since the authentication information can be used to identify a user who is using a mobile router, means may be provided that can download settings to a mobile router.

In this way, by holding the mobile router setting information of each user in management server 110 and referring to authentication information to download relevant setting information to a mobile router, the mobile router can obtain setting information in accordance with the user who is using the mobile router (authentication information). As a result, the setting of a mobile router can be changed dynamically for each item of authentication information by the same hardware, whereby a service such as renting a mobile router can be provided.

A means may be provided in management server 110 that manages continuous registration time for each item of authentication information or for each mobile router.

In this way, a pay-for-use charging-system service can be realized by totalizing the utilization time of management server 110 for each prescribed interval, or authentication information can be used to limit, for example, the time of continuous use for each user.

The above-described mobile router information management server and mobile routers can be realized by hardware, software, or a combination of hardware and software. In this case, no particular limitations are imposed on the configuration of hardware and software and any form can be applied that is capable of realizing the above-described functions.

All or a part of the above-described exemplary embodiment can be described as in the following supplementary notes but is not limited to the following supplementary notes.

[Supplementary Note 1] A mobile router information management server capable of communicating with mobile routers that can be equipped with detachable mobile communication terminals, comprising: a mobile router registration information table that registers, for each mobile router, mobile router information that is reported from said mobile router and that includes identification information of the mobile router and identification information of a mobile communication terminals equipped in the mobile router; and control means that, in response to inquiry information from said mobile router that includes identification information of another mobile router that is to be a communication destination, searches said mobile router registration information table, based on the identification information of said other mobile router, for mobile router information that includes the identification information of mobile communication terminals equipped in said other mobile router and returns the searched mobile router information to said mobile router.

[Supplementary Note 2] The mobile router information management server described in Supplementary Note 1, wherein: said identification information of said mobile router includes a router name of said mobile router and a LAN-side IP address of said mobile router; said identification information of said mobile communication terminals includes a WAN-side IP address for communicating on a wide-area IP network and a telephone number for communicating on a circuit switching network; and said control means, in response to inquiry information from said mobile router that includes a router name of another mobile router that is to be a communication destination, searches said mobile router registration information table with the router name as a key for mobile router information that includes identification information of mobile communication terminals equipped in the other mobile router, and returns the searched mobile router information to said mobile router.

[Supplementary Note 3] A mobile router that can be equipped with detachable mobile communication terminals, comprising: a mobile router information table that registers, as its own mobile router information, identification information of its own mobile router in association with identification information of mobile communication terminals equipped in its own mobile router; and control means that reports its own mobile router information registered in said mobile router information table to a mobile router information management server by control communication so as to enable registration; when communicating with another mobile router that is to be a communication destination, transmits inquiry information that includes identification information of said other mobile router to said mobile router information management server; receives mobile router information that is returned from said mobile router information management server in response to the inquiry information; and initiates communication with said other mobile router based on identification information of mobile communication terminals that are equipped in said other mobile router that is included in the mobile router information.

[Supplementary Note 4] The mobile router described in Supplementary Note 3, wherein: said mobile communication terminals include a mobile communication terminal for wide-area IP network connections and a mobile communication terminal for circuit switching network connections; identification information of said mobile router itself includes its own router name and its own LAN-side IP address; identification information of mobile communication terminals equipped in said mobile router includes a WAN-side IP address of said mobile communication terminal for wide-area IP network connection use and a telephone number of said mobile communication terminal for circuit switching network connection use; and said control means, when communicating with said other mobile router, transmits inquiry information that contains the router name of said other mobile router to said mobile router information management server.

[Supplementary Note 5] The mobile router described in Supplementary Note 3 or 4, further comprising: a registry management server information table that registers identification information of said mobile router information management server; wherein said control means, based on identification information of a server that is registered in said registry management server information table, reports to said mobile router information management server its own most recent mobile router information at the time of periodic updating or when a change occurs in the identification information of the mobile communication terminals equipped in its own mobile router.

[Supplementary Note 6] The mobile router described in any of Supplementary Notes 3 to 5, further comprising: a destination mobile router information table that registers mobile router information that includes the router name of another mobile router that is to be a communication destination and identification information of mobile communication terminals that are equipped in the other mobile router that is returned from said mobile router information management server in response to inquiry information that contains said router name; wherein said control means initiates communication with said other mobile router based on identification information of mobile communication terminals that are contained in the mobile router information that has been registered in said destination mobile router information table.

[Supplementary Note 7] A mobile router network characterized in that it comprises: mobile routers that can be equipped with detachable mobile communication terminals; and a mobile router information management server that can communicate with said mobile routers, wherein said mobile router information management server comprises: a mobile router registration information table that registers, for each mobile router, mobile router information that is reported from said mobile routers and that includes identification information of said mobile routers and identification information of mobile communication terminals equipped in said mobile router; and control means that, in response to inquiry information from said mobile router that includes identification information of another mobile router that is to be a communication destination, searches said mobile router registration information table, based on the identification information of said other mobile router, for mobile router information that includes the identification information of mobile communication terminals equipped in said other mobile router and returns the searched mobile router information to said mobile routers; and each of said mobile routers comprises: a mobile router information table that registers, as its own mobile router information, identification information of its own mobile router in association with identification information of mobile communication terminals equipped in its own mobile router; and control means that reports its own mobile router information registered in said mobile router information table to said mobile router information management server by control communication so as to enable registration; when communicating with another mobile router that is to be a communication destination, transmits inquiry information that includes identification information of said other mobile router to said mobile router information management server; receives mobile router information that is returned from said mobile router information management server in response to the inquiry information; and initiates communication with said other mobile router based on identification information of mobile communication terminals that are equipped in said other mobile router contained in the mobile router information.

[Supplementary Note 8] A communication method of a mobile router information management server that can communicate with mobile routers that can be equipped with detachable mobile communication terminals, the method being characterized in that it comprises: registering in a mobile router registration information table, for each mobile router, mobile router information reported from said mobile router that includes identification information of the mobile routers and identification information of mobile communication terminals equipped in the mobile router; and in response to inquiry information from said mobile router that includes identification information of another mobile router that is to be a communication destination, searching said mobile router registration information table, based on identification information of said other mobile router, for mobile router information that includes identification information of mobile communication terminals equipped in the other mobile router; and returning the searched mobile router information to said mobile router.

[Supplementary Note 9] A communication method of a mobile router that can be equipped with detachable mobile communication terminals, the method being characterized in that it comprises: registering in a mobile router information table, as its own mobile router information, identification information of its own mobile router in association with identification information of mobile communication terminals equipped in its own mobile router; reporting its own mobile router information that is registered in said mobile router information table to a mobile router information management server by control communication so as to enable registration; when communicating with another mobile router that is to be a communication destination, transmitting, to said mobile router information management server, inquiry information that includes identification information of said other mobile router; receiving mobile router information that is returned from said mobile router information management server in response to the inquiry information; and initiating communication with said other mobile router based on identification information of mobile communication terminals that are equipped in said other mobile router contained in the mobile router information.

[Supplementary Note 10] A communication method of a mobile router network that includes mobile routers that can be equipped with detachable mobile communication terminals and a mobile router information management server that can communicate with said mobile routers, said method being characterized in that it comprises: said mobile router: registering in a mobile router information table, as its own mobile router information, identification information of its own mobile router in association with identification information of mobile communication terminals equipped in its own mobile router; and reporting its own mobile router information that has been registered to said mobile router information management server by control communication so as to enable registration; said mobile router information management server: registering in a mobile router registration information table, for each mobile router, mobile router information that is communicated from said mobile routers and that includes identification information of the mobile routers and identification information of mobile communication terminals equipped in said mobile routers; said mobile router: when communicating with another mobile router that is to be a communication destination, transmitting inquiry information that includes identification information of said other mobile router to said mobile router information management server; said mobile router information management server: in response to inquiry information from said mobile router that includes identification information of another mobile router that is to be a communication destination, searching said mobile router registration information table, based on identification information of said other mobile router, for mobile router information that includes identification information of mobile communication terminals equipped in the other mobile router; and returning the searched mobile router information to said mobile router; and said mobile router: receiving mobile router information that is returned from said mobile router information management server in response to said inquiry information, and initiating communication with said other mobile router based on identification information of mobile communication terminals that are equipped in said other mobile router included in the mobile router information.

Although the invention of the present application has been described with reference to exemplary embodiments, the invention of the present application is not limited to the above-described exemplary embodiments. The construction and details of the invention of the present application are open to various modifications within the scope of the invention of the present application that will be clear to one of ordinary skill in the art.

This application claims priority based on Japanese Patent Application No. 2010-243514, filed on Oct. 29, 2010, all of the disclosures of which are incorporated herein by reference.

INDUSTRIAL APPLICABILITY

The present invention, as described hereinabove, can be used in a device that is capable of network connections.

REFERENCE SIGNS LIST 100 wide-area IP network
101 circuit switching network
110 management server (mobile router information management server)
111 mobile router A
112 mobile router B
120 communication terminal (for use in a wide-area IP network)
121 mobile communication terminal (for use in a wide-area IP network)
122 mobile communication terminal (for use in a circuit switching network)
130 terminal A 131 terminal B
200 mobile router information table
300 registry management server information table
400 mobile router registration information table
500 destination mobile router information table
610 device control unit
620 TCP/IP
630 data control unit
631 packet analysis unit
632 packet generation unit
640 data storage unit
650 setting unit
660 timer unit
670 client control unit
680 mobile IP control unit
710 device control unit
720 TCP/IP
730 packet analysis unit
731 packet generation unit
740 data storage unit
750 timer unit
760 server control unit

The invention claimed is:

1. A mobile router information management server capable of communicating via a radio network with mobile routers that can be equipped with detachable mobile communication terminals, comprising:
a mobile router registration information table that registers, for each mobile router, mobile router information that is reported from said mobile router and that includes identification information of the mobile router and identification information of a mobile communication terminals equipped in the mobile router; and
control means that, in response to inquiry information from said mobile router that includes identification information of another mobile router that is to be a communication destination, searches said mobile router registration information table, based on the identification information of said other mobile router, for mobile router information that includes the identification information of mobile communication terminals equipped in said other mobile router and returns the searched mobile router information to said mobile router.

2. The mobile router information management server as set forth in claim 1, wherein:
said identification information of said mobile router includes a router name of said mobile router and a LAN-side IP address of said mobile router;
said identification information of said mobile communication terminals includes a WAN-side IP address for communicating on a wide-area IP network and a telephone number for communicating on a circuit switching network; and
said control means, in response to inquiry information from said mobile router that includes a router name of another mobile router that is to be a communication destination, searches said mobile router registration information table with the router name as a key for mobile router information that includes identification information of mobile communication terminals equipped in the other mobile router, and returns the searched mobile router information to said mobile router.

3. A mobile router that can be equipped with detachable mobile communication terminals, comprising:
a mobile router information table that registers, as mobile router information of said mobile router, identification information of said mobile router in association with identification information of mobile communication terminals equipped in said mobile router; and
control means that reports said mobile router information of said mobile router that is registered in said mobile router information table to a mobile router information management server by control communication so as to enable registration; when communicating with another mobile router that is to be a communication destination, transmits inquiry information that includes identification information of said other mobile router to said mobile router information management server; receives mobile router information that is returned from said mobile router information management server in response to the inquiry information; and initiates communication with said other mobile router based on identification information of mobile communication terminals that are equipped in said other mobile router that is included in the mobile router information.

4. The mobile router as set forth in claim 3, wherein:
said mobile communication terminals include a mobile communication terminal for wide-area IP network connections and a mobile communication terminal for circuit switching network connections;
identification information of said mobile router itself includes a router name of said mobile router and LAN-side IP address of said mobile router;
identification information of mobile communication terminals equipped in said mobile router includes user information that includes a WAN-side IP address of said mobile communication terminal for wide-area IP network connection use and a telephone number of said mobile communication terminal for circuit switching network connection use; and
said control means, when communicating with said other mobile router, transmits inquiry information that contains the router name of said other mobile router to said mobile router information management server.

5. The mobile router as set forth in claim 4, further comprising:
a registry management server information table that registers identification information of said mobile router information management server;
wherein said control means, based on identification information of a server that is registered in said registry management server information table, reports to said mobile router information management server most recent mobile router information of said mobile router at the time of periodic updating or when a change occurs in the identification information of the mobile communication terminals equipped in said mobile router.

6. The mobile router as set forth in claim 4, further comprising:
a destination mobile router information table that registers mobile router information that includes the router name of another mobile router that is to be a communication destination and identification information of mobile communication terminals that are equipped in the other mobile router that is returned from said mobile router information management server in response to inquiry information that contains said router name;
wherein said control means initiates communication with said other mobile router based on identification information of mobile communication terminals that are contained in the mobile router information that has been registered in said destination mobile router information table.

7. The mobile router as set forth in claim 3, further comprising:
   a registry management server information table that registers identification information of said mobile router information management server;
   wherein said control means, based on identification information of a server that is registered in said registry management server information table, reports to said mobile router information management server most recent mobile router information of said mobile router at the time of periodic updating or when a change occurs in the identification information of the mobile communication terminals equipped in said mobile router.

8. The mobile router as set forth in claim 7, further comprising:
   a destination mobile router information table that registers mobile router information that includes the router name of another mobile router that is to be a communication destination and identification information of mobile communication terminals that are equipped in the other mobile router that is returned from said mobile router information management server in response to inquiry information that contains said router name;
   wherein said control means initiates communication with said other mobile router based on identification information of mobile communication terminals that are contained in the mobile router information that has been registered in said destination mobile router information table.

9. The mobile router as set forth in claim 8, further comprising:
   a destination mobile router information table that registers mobile router information that includes the router name of another mobile router that is to be a communication destination and identification information of mobile communication terminals that are equipped in the other mobile router that is returned from said mobile router information management server in response to inquiry information that contains said router name;
   wherein said control means initiates communication with said other mobile router based on identification information of mobile communication terminals that are contained in the mobile router information that has been registered in said destination mobile router information table.

10. The mobile router as set forth in claim 3, further comprising:
    a destination mobile router information table that registers mobile router information that includes the router name of another mobile router that is to be a communication destination and identification information of mobile communication terminals that are equipped in the other mobile router that is returned from said mobile router information management server in response to inquiry information that contains said router name;
    wherein said control means initiates communication with said other mobile router based on identification information of mobile communication terminals that are contained in the mobile router information that has been registered in said destination mobile router information table.

11. A communication method of a mobile router that can be equipped with detachable mobile communication terminals, the method comprising:
    registering in a mobile router information table, as mobile router information of said mobile router, identification information of said mobile router in association with identification information of mobile communication terminals equipped in said mobile router;
    reporting said mobile router information of said mobile router that is registered in said mobile router information table to a mobile router information management server by control communication so as to enable registration;
    when communicating with another mobile router that is to be a communication destination, transmitting, to said mobile router information management server, inquiry information that includes identification information of said other mobile router;
    receiving mobile router information that is returned from said mobile router information management server in response to the inquiry information; and
    initiating communication with said other mobile router based on identification information of mobile communication terminals that are equipped in said other mobile router contained in the mobile router information.

* * * * *